3,256,259
POLYMERS OF REDUCED MOLECULAR WEIGHT
Francis M. Seger, Edison, and Victor C. Serreze, Warren, N.J., assignors to Socony Mobil Oil Company, Inc., a corporation of New York
Filed Mar. 8, 1963, Ser. No. 263,758
12 Claims. (Cl. 260—93.7)

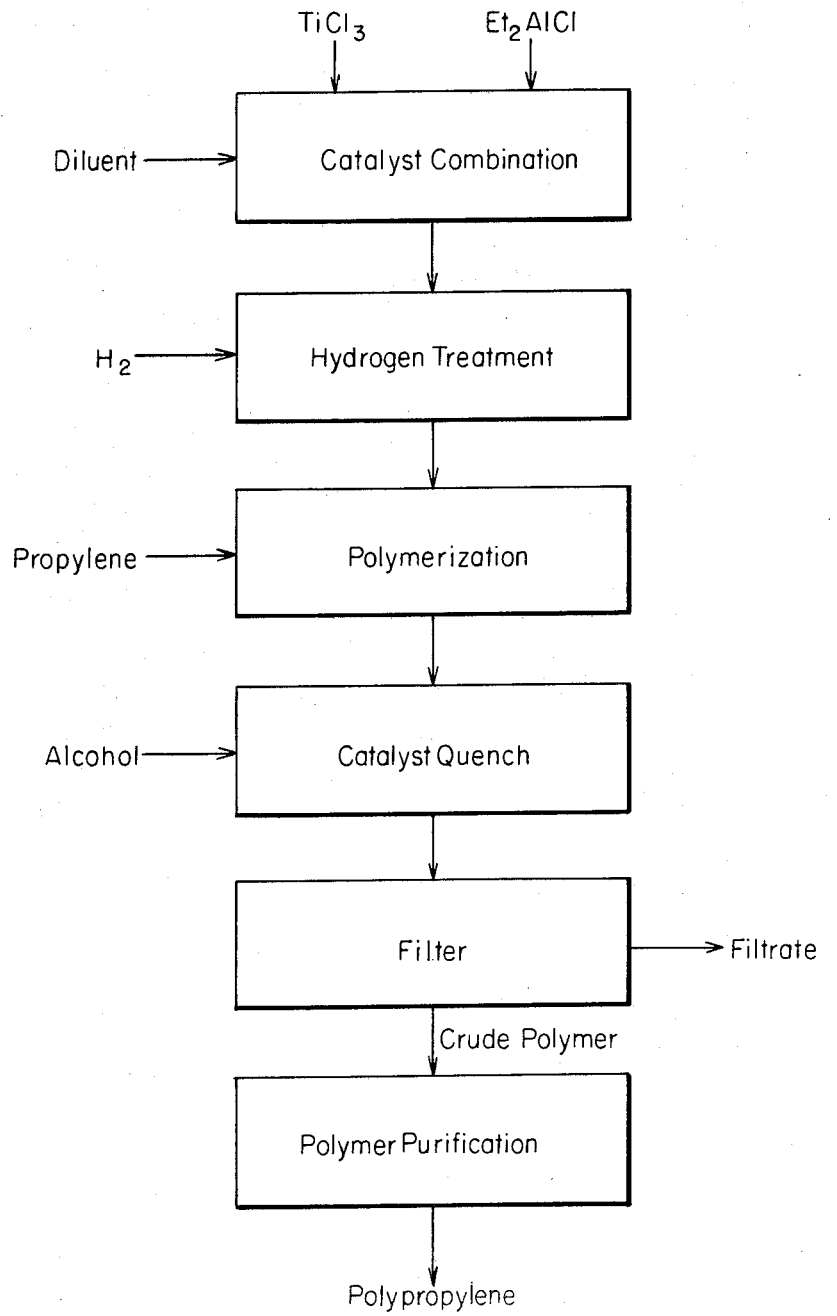

The invention is concerned with polymers of olefinic hydrocarbons. It is more particularly concerned with an improved catalyst system for producing crystalline polyolefins of reduced molecular weight.

As is well known to those familiar with the art, highly tactic polymers of olefinic hydrocarbons having the formula, $CH_2=CHR$, wherein R is an alkyl radical having one to eight carbon atoms, a cycloalkyl radical, or an aryl radical, can be prepared in the presence of a catalyst system comprising (A) a compound of a transitional metal of Groups IV-A, V-A, VI-A, and VIII of the Periodic Arrangement of the Elements wherein the metal is present in a valence state lower than its maximum and (B) an organometallic compound of metals of Groups II and III of the Periodic Arrangement of the Elements. Crystalline linear polyethylene can also be produced under relatively mild conditions, in the presence of the aforedescribed catalyst system. Such polymers, however, tend to have a very high degree of polymerization, i.e., a very high average molecular weight. This property, with concomitant high viscosity and melting point, renders the polymer difficult to work and disadvantageous in polymer applications, such as plastic molding.

In United States Letters Patent No. 3,051,690, a process has been proposed to reduce the average molecular weight of these polymers by carrying out the polymerization in the presence of hydrogen. In that process hydrogen gas, in an amount based upon the amount of olefin monomer charged, is introduced into the polymerization zone or reaction vessel either in the beginning of the polymerization or during the polymerization reaction. Generally, however, in the case of olefin monomers other than ethylene, when molecular weight is controlled in this manner, the amount of tacticity tends to be reduced as the molecular weight decreases. It is highly desirable to produce tactic polymers having both reduced molecular weight and high degree of tacticity.

The term "tactic" is a generic term applied to polymers in which there is an ordered structure with respect to the configurations around at least one main-chain site of steric isomerism per conventional base unit. Numerous types of tacticity are recognized in the art. Within the contemplation of this invention, a measure of steric order is the weight percent of the solid polymer that is insoluble in boiling n-heptane. A linear polymer of one or more monoolefinic hydrocarbons that is insoluble in boiling n-heptane is considered to be tactic.

It has now been found that lower molecular weight crystalline linear polyethylene and tactic polymers of alphaolefinic hydrocarbons that have both reduced molecular weight and high degree of tacticity, can be produced readily in the presence of a novel catalyst system. It has been discovered that such polymers are produced when the catalyst system of transitional metal compound and organometallic compound, as aforementioned, is treated with hydrogen.

Accordingly, it is a broad object of this invention to provide an improved polymerization catalyst system. Another object is to provide an improved polymerization process. A specific object is to provide an improved catalyst system for producing linear polyethylene and tactic polymers of alpha-olefinic hydrocarbons. Another specific object is to provide a method for producing low molecular weight crystalline linear polyethylene, and tactic polymers having reduced molecular weight and a high degree of tacticity. A further specific object is to provide an improved continuous process for producing highly tactic polymers. Other objects and advantages of this invention will become more apparent to those skilled in the art from the following detailed description, considered in conjunction with the drawing, which sets forth a diagrammatic representation of a typical arrangement for preparing the improved catalyst of this invention and for polymerizing alpha-olefinic hydrocarbons therewith.

This invention provides an improved catalyst system for producing crystalline linear polyethylene and tactic polymers of alpha-olefinic hydrocarbons that is prepared by combining (A) a compound of a transitional metal and (B) an organometallic compound and treating with hydrogen, in an amount varying between 1 mole and about 8 moles per mole of said compound of a transitional metal; said compound of a transitional metal being a compound of a metal of Groups IV-A, V-A, VI-A, and VIII of the Periodic Arrangement of the Elements wherein the metal is present in a valence state lower than its maximum; and said organometallic compound being a compound of a metal of Groups II and III of the Periodic Arrangement of the Elements.

Another embodiment of this invention provides an improved polymerization of alpha-olefinic hydrocarbons carried out in the presence of this improved catalyst system.

Another embodiment of this invention provides, in a continuous process for producing polymers of the olefinic hydrocarbon ethylene or olefinic hydrocarbons having the formula, $CH_2=CHR$, wherein R is an alkyl radical having from one to eight carbon atoms, a cycloalkyl radical, or an aryl radical; wherein a catalyst system is continuously introduced into a polymerization zone at least one of said olefinic hydrocarbons is continuously introduced into said polymerization zone in contact with said catalyst system to produce polymer product, and polymer product is continuously withdrawn from said polymerization zone; the improvement wherein said catalyst system is formed by combining (A) a compound of a transitional metal, (B) an organometallic compound, and hydrogen; said compound of a transitional metal being a compound of a metal of Groups IV-A, V-A, VI-A, and VIII of the Periodic Arrangement of the Elements wherein the metal is present in a valence state lower than its maximum; and said organometallic compound being a compound of a metal of Groups II and III of the Periodic Arrangement of the Elements.

The monomer that is polymerized with the catalyst of this invention can be ethylene or an olefinic hydrocarbon having the formula, $CH_2=CHR$, wherein R is an alkyl radical having from one to eight carbon atoms, a cycloalkyl radical, or an aryl radical. Non-limiting examples of the monomer reactant are ethylene; propylene; butene-1; pentene-1; 3-methylbutene-1; hexene-1; 3-methylpentene-1; 4-methylpentene-1; heptene-1; 4-methylheptene-1; octene-1; nonene-1; docene-1; vinyl cyclohexane; styrene; p-methylstyrene and other ring alkyl-substituted styrenes. Copolymerization with two or more monomers is contemplated, as well as homopolymerization.

The catalyst system used in the process of this invention is formed by combining at least two components, and treating with hydrogen; one of said components being a compound of a transitional metal of Groups IV-A, V-A, VI-A, and VIII of the Periodic Arrangement of the Elements in a reduced valence state, and the other component being an organiometallic compound of a metal of Groups II and III of the Periodic Arrangement of the Elements. The Periodic Arrangement of the Elements as referred to herein, is that published in the Journal of Chemical Education, volume 16, page 409 (1939).

Among the reducible metal compounds suitable for producing the transitional metal compound component for the purposes of this invention are the heavy metal, inorganic compounds such as halides, oxyhalides, complex halides, hydroxides; and organic compounds such as alcoholates, acetates, benzoates, and acetyl acetonates, of the metals of Groups IV–A, V–A, VI–A, and VIII of the Periodic Arrangement of the Elements. Such metals include titanium, zirconium, hafnium, thorium, uranium, vanadium, niobium, tantalum, chromium, molybdenum, tungsten and iron. The metal halides, particularly the chlorides are generally preferred. Titanium, zirconium, and vanadium are the most active metals. The following heavy metal compounds are readily reducible: titanium tetrachloride, titanium tetrabromide, zirconium tetrachloride, vanadium tetrachloride, and zirconium acetylacetonate.

In order to form the transitional metal compound component, these heavy metal compounds can be reduced to valence states lower than maximum valence by a number of ways well known in the art. As exemplified by titanium tetrachloride, it can be reduced to titanium trichloride (with or without some titanium dichloride) by hydrogen to a brown amorphous substance, which is converted into the violet crystalline form by heating at an elevated temperature in the order of 200° C. The reduction can be accomplished by heating titanium tetrachloride with metallic titanium or aluminum under pressure. This reduction can be promoted by Friedel-Crafts halides. In the case of the aluminum reduction, the product will comprise reduced titanium chloride and aluminum trichloride. The reduction can also be effected by an organometallic compound of Group II or III to produce a crystalline titanium halide in a valence state lower than maximum. Suitable materials for this reduction are aluminum alkyls, the aluminum trialkyls being preferred. In practicing the present invention, the particular method of obtaining the heavy metal compound of reduced valence state is not pertinent. Indeed, many reduced compounds contemplated herein are commercially available.

The other component of the catalyst system is an organometallic compound of a metal of Groups II and III. These compounds will have at least one hydrocarbon radical, i.e., alkyl, cycloalkyl, aralkyl, alkaryl, or aryl, attached to the metal through a carbon atom. The other substituents in the organometallic compound can be hydrocarbon radicals, halogen radicals, alkoxy, amino, hydrogen, etc., or combinations thereof. Non-limiting examples of the organiometallic compounds are triethylaluminum, tripropylaluminum, dipropylzinc, triisobutylaluminum, diethylmagnesium, diphenylaluminum chloride, cyclohexyl-ethylzinc, diethylaluminum bromide, diethylaluminum chloride, ethylzinc chloride, propylmagnesium chloride, dipropylaluminum chloride, dioctylaluminum chloride, diisobutylaluminum hydride, phenylaluminum dihydride, cyclohexylbromo aluminum hydride, dipropylaluminum hydride, propyl zinc hydride, ethylmagnesium hydride, methoxyaluminum diethyl, and alkyl aluminum sesquihalides, such as ethyl aluminum sesquichloride.

However, in polymerizations carried out at substantially atmospheric pressure, alkyl metal compounds containing no halogen, e.g., aluminum trialkyls, magnesium dialkyls, and zinc dialkyls, are most suitable. Of these the aluminum trialkyls, e.g., aluminum triethyl, aluminum tripropyl and aluminum triisobutyl are preferred.

In combining the reduced transitional metal compound, e.g., $TiCl_3$ with a metal organic compound, e.g., aluminum trialkyl, various proportions may be used. For instance, the molar Al/Ti ratio of these two constituents may range from 0.1 to 20, preferably about 1 to about 10 mols of the aluminum trialkyl or other organometallic compound per mol of $TiCl_3$ or other partially reduced transition metal compound.

The novel catalyst system of this invention is formed by combining the transitional metal compound component and the organometallic compound component, and treating with hydrogen; in the absence of olefin monomer.

The amount of hydrogen gas that is contacted with the catalyst components will be between about one mole and about eight moles per mole of transitional metal compound.

The catalyst system can be prepared in several ways, including:

(1) The transitional metal compound component and the organometallic compound component can be mixed and heated in the presence of hydrogen, at a temperature of between about 68° F. (20° C.) and about 170° F. (77° C.), for a period of time of between about 5 minutes and about one hour.

(2) The transitional metal compound component and the organometallic compound component can be initially mixed and heated in an inert atmosphere, at a temperature of between about 68° F. (20° C.) and about 170° F. (77° C.), for a period of time of between about 5 minutes and about one hour. Then hydrogen is introduced and mixing is continued at a temperature of between about 68° F. (20° C.) and about 100° F. (38° C.) for a period of time of between about 10 minutes and about 20 hours.

(3) In the particular case wherein the transitional metal compound (of higher valence state) is reduced with hydrogen to form the transitional metal compound component, excess hydrogen can be maintained in the system during subsequent grinding and final reaction with the organometallic compound component.

The catalyst components are usually combined in an inert organic diluent for ease in mixing, handling, and storing. A diluent may be omitted, however. Suitable diluents are aliphatic hydrocarbons, such as hexane, heptane, isooctane, etc.; cycloaliphatic hydrocarbons, such as cyclohexane; aromatic hydrocarbons, such as benzene, toluene, xylene, decalin, etc.; highly paraffinic hydrocarbon fractions; and distillate fractions rich in mononuclear aromatic hydrocarbons.

The composition of the novel catalyst system of this invention is not known. Its performance, however, demonstrates that it is different in nature from conventional catalysts. Thus, in the case of tactic polymers produced under identical polymerization conditions, the catalyst of this invention produces a polymer having a lower molecular weight and a higher degree of tacticity than is produced when the conventional combination of transitional metal compound component and organometallic compound component is not treated with hydrogen in the absence of olefin monomer. As compared to polymerization using the conventional combination wherein hydrogen is added to the polymerization to control molecular weight, the catalyst system of this invention produces a polymer having a high degree of tacticity and a reduced molecular weight, without resort to the use of hydrogen during polymerization.

The amount of the catalyst system of this invention that is used in carrying out polymerization of olefins can vary widely from a minor catalytic amount to a large excess. The olefin charge rate can be as high as about 10,000 moles per mole of transitional metal compound. Conversions will vary from about 50 g. polymer per gram transitional metal compound to about 1000 grams polymer, generally from about 200 to about 400 grams polymer per gram transitional metal compound.

The polymerization reaction is carried out at temperatures varying between about −80° C. (−112° F.) and about 220° C. (428° F.), preferably between about 20° C. (68° F.) and about 150° C. (302° F.). The pressure employed in the reactor can be substantially atmospheric pressure and up to about 30 atmospheres pressure and higher. In practice the pressure will be between about one and about 10 atmospheres.

The polymerization reaction can be carried out in the presence of a diluent. Suitable diluents are the same hydrocarbon diluents described hereinbefore as utilizable in the preparation of the catalyst system. If a diluent is employed, it can be the same diluent used (if any is used) in the catalyst preparation or it can be a different hydrocarbon diluent. It is also contemplated to operate without use of an extraneous diluent. In this case there is used an excess of olefin monomer which will remain at least partially in the liquid phase and act as a diluent for the polymerization reaction.

Upon completion of the polymerization reaction, the catalyst may be completely deactivated and polymer product coagulated, e.g., by the addition of an alcohol, such as methanol, isopropyl alcohol, or n-butyl alcohol, in amounts of about 10 to 100 times the amount of catalyst used. The reaction slurry may then be filtered, the filter cake reslurried in a catalyst solvent, such as dry, concentrated alcohol at about 50 to 100° C. for 15 to 60 minutes, filtered again and the filter cake dried, preferably under reduced pressure. Ash residues in the polymer are reduced below about 0.05% by this procedure. If necessary the ash content may be further reduced, e.g., by aqueous acid treatment according to methods well known in the art, or by using chelating agents, such as acetylacetone.

In using the catalyst system of this invention for polymerization, the polymerization reaction can be carried out batchwise. The process is however readily and feasibly carried out in a continuous system. In the attached drawing there is set forth a flow diagram of a suitable procedure for preparing the catalyst system of this invention and utilizing it in a continuous polymerization reaction.

Referring to the drawing, the process will be described for the polymerization of propylene using a titanium trichloride-diethylaluminum chloride combination that is treated with hydrogen. It will be understood that other olefins and catalyst combinations, as described hereinbefore, can be used.

Titanium trichloride ($TiCl_3$) and diethylaluminum chloride ($Et_2AlCl$) are combined in a reaction vessel in desired proportion, such as with Al:Ti molar ratio of 2. Preferably a diluent, such as n-heptane, is used. The mixture of catalyst components and diluent is agitated and heated at a temperature of about 70–170° F. under an atmosphere of inert gas, such as nitrogen.

The resultant slurry is then treated, in the same vessel or a different vessel, with hydrogen to produce the catalyst system of this invention. As noted hereinbefore, the mixing of catalyst components and treatment with hydrogen can be carried out in two successive steps. Alternatively, hydrogen can be added during the initial combination of the catalyst components.

The catalyst system is then introduced continuously, in catalytic amounts, into a polymerization reaction vessel operated under polymerization conditions (e.g., 170° F. and 125 p.s.i.g.). Propylene is continuously introduced, in an amount sufficient to maintain desired pressure. A separate stream of diluent is also continuously charged.

A slurry of crude polymer product and catalyst in the diluent is continuously withdrawn from the polymerization vessel and treated with alcohol to deactivate (quench) the catalyst. The quenched mixture is filtered to separate polypropylene, which can be subjected to further purification to produce finished polymer.

The following examples demonstrate the improved catalyst system of this invention and the utilization and advantages thereof in a polymerization process. In all runs, the catalyst system was prepared in a pressure vessel independent of the polymerization reactor and in the absence of the olefin monomer and fed from the pressure vessel to the reactor. Catalyst preparations are described in the examples.

In all runs, the continuous polymerization reaction was carried out as follows:

Continuous polymerization method

The reactor was filled with heptane and heated to 160° F. Then it was pressurized with propylene to a pressure of 125 p.s.i.g. before catalyst flow was commenced. Catalyst, heptane, and propylene were continuously fed to the reactor. Flow rates were adjusted to give a catalyst flow rate of 1 g. titanium trichloride per hour and a residence time of one hour at 125 p.s.i.g. Feed flows were at ambient temperature of 160° F. (about 71° C.). The reaction mixture was continuously agitated at a stirring rate of 600 r.p.m. and the reactor was cooled, as required, to maintain a reactor temperature fo 160° F. A polymer product slurry in heptane was continuously removed from the reactor and passed into a stirred vessel containing a mixture of isopropanol and heptane (1:9 alcohol heptane volume ratio), in order to deactivate the catalyst. The polymer product was separated by filtration, washed with isopropanol, and dried. In order to determine the order of magnitude of molecular weight, the reduced specific viscosity (RSV) of the whole, dried polymer and of the tactic portion thereof was determined in accordance with ASTM Procedure D 1601–59T. The percent of the dried polymer that was insoluble in boiling n-heptane, i.e., the percent tacticity, was also determined.

EXAMPLE 1

Heptane (17,000 ml.) was added to a pressure vessel, which was purged and blanketed with nitrogen gas. Diethyl aluminum chloride and titanium trichloride in a molar ratio of Al:Ti of 2 were added to the pressure vessel, under a blanket of nitrogen. During the addition of these catalyst components and throughout the preparation and charging of the catalyst system, the contents of the pressure vessel were agitated. The pressure vessel was heated to 170° F. and maintained at about that temperature for one hour. Then, the contents of the vessel were quickly cooled to about 75° F. Hydrogen, in an amount of one mole hydrogen per mole titanium trichloride, was added in the upper portion of the vessel and agitation was continued for one hour at 75° F. to produce a catalyst system of this invention.

This catalyst system was used in the continuous polymerization of propylene, using the aforedescribed continuous polymerization method. Pertinent data and properties of the polypropylene are set forth in the table.

EXAMPLE 2

A catalyst system of this invention was prepared as described in Example 1, except that the amount of hydrogen used was 2 moles of hydrogen per mole titanium trichloride. This catalyst system was used to polymerize propylene, using the aforedescribed continuous polymerization method. Pertinent data and properties of the polypropylene are set forth in the table.

EXAMPLE 3

A catalyst system of this invention was prepared as described in Example 1, except that the amount of hydrogen used was 4 moles of hydrogen per mole titanium trichloride. This catalyst system was used to polymerize propylene using the aforedescribed continuous polymerization method. Pertinent data and properties of the polypropylene are set forth in the table.

For comparison purposes, runs were made as proposed in the art, wherein the hydrogen was added to the polymerization reactor and not added during the catalyst preparation. Thus, the catalyst was prepared in the absence of hydrogen but the polymerization was carried out in the presence of hydrogen.

EXAMPLE 4

Heptane was added to a pressure vessel which was purged and blanketed with nitrogen. Diethyl aluminum chloride and titanium trichloride in a molar ratio of Al:Ti of 2 were added to the pressure vessel under a blanket of nitrogen. During the addition of the catalyst components and throughout the preparation and charging of the catalyst system, the contents of the pressure vessel were agitated. The pressure vessel was heated to 170° F. and maintained at about that temperature for one hour and then cooled to 75° F.–100° F. before use.

This catalyst was used in the continuous polymerization of propylene, using the aforedescribed continuous polymerizational method modified, however, to the extent that hydrogen was added continuously to the polymerization reactor in the amount of one mole hydrogen per mole titanium trichloride. Pertinent data and properties of the polypropylene are set forth in the table.

EXAMPLE 5

A catalyst prepared as described in Example 4, was used in the continuous polymerization of propylene, using the aforedescribed continuous polymerization method modified, however, to the extent that hydrogen was added continuously to the polymerization reactor in the amount of 2 moles hydrogen per mole titanium trichloride. Pertinent data and properties of the polypropylene are set forth in the table.

EXAMPLE 6

A catalyst prepared as described in Example 4 was used in the continuous polymerization of propylene using the aforedescribed continuous polymerization method modified, however, to the extent that hydrogen was added continuously to the polymerization reactor in the amount of 3 moles hydrogen per mole titanium trichloride. Pertinent data and properties of the polypropylene are set forth in the table.

EXAMPLE 7

In a control run wherein no hydrogen whatever was used, a catalyst prepared as described in Example 4 was used in the continuous polymerization of propylene using the aforedescribed continuous polymerization method without modification. Pertinent data and properties of the polypropylene are set forth in the table.

TABLE

| Example | 1 | 2 | 3 | 4 | 5 | 6 | 7 |
|---|---|---|---|---|---|---|---|
| $H_2$ Addition | (1) | (1) | (1) | (2) | (2) | (2) | None |
| Mole $H_2$ per Mole $TiCl_3$ | 1:1 | 2:1 | 4:1 | 1:1 | 2:1 | 3:1 | ---- |
| RSV (whole) | 4.3 | 5.0 | 4.0 | 2.3 | 3.2 | 1.2 | 7.1 |
| RSV (tactic) | 4.3 | 5.0 | 4.2 | 2.4 | 3.2 | 1.5 | 7.8 |
| Percent Insoluble in Heptane | 96 | 97 | 97 | 88 | 91 | 65 | 90 |

1 To Catalyst Preparation.
2 To Polymerization Zone.

From the data in the table, it will be apparent, in comparison with polymerization without any hydrogen used (Example 7), that the use of the hydrogen treated catalyst of this invention (Examples 1, 2, and 3) produces a polymer having decreased molecular weight, as measured by RSV, and also having a greater degree of tacticity. On the other hand, when hydrogen is charged to the polymerization zone (Examples 4, 5, and 6), molecular weight is decreased at the expense of decreased tacticity.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A catalyst system for producing crystalline linear polyethylene and tactic polymers of alpha-olefins that is prepared by combining (A) a compound of a transitional metal and (B) an organometallic compound, and treating with hydrogen, in an amount varying between about one mole and about 8 moles per mole of said compound of a transitional metal, in the absence of olefin monomer, at a temperature of between about 20° C. and about 77° C., and for a period of time between about 5 minutes and about one hour; said compound of a transitional metal being a compound of a metal of Groups IV–A, V–A, VI–A, and VIII of the Periodic Arrangement of the Elements wherein the metal is present in a valence state lower than its maximum; said organometallic compound being a compound of a metal of Groups II and III of the Periodic Arrangement of the Elements; and the molar ratio of (B) to (A) being between about 0.1 and about 20.

2. The catalyst composition defined in claim 1, wherein said (A) a compound of a transitional metal is a titanium halide.

3. The catalyst composition defined in claim 2, wherein said (B) an organometallic compound is an organoaluminum compound.

4. An improved catalyst system that is prepared by combining (A) titanium trichloride and (B) diethylaluminum chloride, and treating with hydrogen in an amount varying between about one mole and about 8 moles per mole of said titanium trichloride, in the absence of olefin monomer, at a temperature of between about 20° C. and about 77° C., and for a period of time between about 5 minutes and about one hour; the molar ratio of (B) to (A) being between about 1 and about 10.

5. In the catalytic polymerization of alpha-olefinic hydrocarbons to crystalline linear polymers, the improvement that comprises carrying out said polymerization in the presence of the catalyst system defined in claim 1.

6. In the catalytic polymerization of alpha-olefinic hydrocarbons to crystalline linear polymers, the improvement that comprises carrying out said polymerization in the presence of the catalyst system defined in claim 2.

7. In the catalytic polymerization of propylene to tactic polypropylene, the improvement that comprises carrying out said polymerization in the presence of the catalyst system defined in claim 3.

8. In the catalytic polymerization of propylene to tactic polypropylene, the improvement that comprises carrying out said polymerization in the presence of the catalyst system defined in claim 4.

9. In a continuous process for producing linear crystalline polymers of alpha-olefinic hydrocarbons; wherein a catalyst system is continuously introduced into a polymerization zone, at least one of said olefinic hydrocarbons is continuously introduced into said polymerization zone in contact with said catalyst system to produce polymer product, and polymer product is continuously withdrawn from said polymerization zone; the improvement wherein said catalyst system is the catalyst system defined in claim 1.

10. In a continuous process for producing linear crystalline polymers of alpha-olefinic hydrocarbons; wherein a catalyst system is continuously introduced into a polymerization zone, at least one of said olfinic hydrocarbons is continuously introduced into said polymerization zone in contact with said catalyst system to produce polymer product, and polymer product is continuously withdrawn from said polymerization zone; the improvement wherein said catalyst system is the catalyst system defined in claim 2.

11. In a continuous process for producing tactic polypropylene wherein a catalyst system is continuously introduced into a polymerization zone, propylene is continuously introduced into said polymerization zone in contact with said catalyst system to produce tactic polypropylene product, and tactic polypropylene product is continuously removed from said polymerization zone; the improvement wherein said catalyst system is the catalyst system defined in claim 3.

12. In a continuous process for producing tactic polypropylene wherein a catalyst system is continuously introduced into a polymerization zone, propylene is continuously introduced into said polymerization zone in contact with said catalyst system to produce tactic polypropylene product, and tactic polypropylene product is continuously removed from said polymerization zone; the improvement wherein said catalyst system is the catalyst system defined in claim 4.

References Cited by the Examiner

UNITED STATES PATENTS 3,051,690   8/1962   Vandenberg _____ 260—94.9

JOSEPH L. SCHOFER, *Primary Examiner.*

F. L. DENSON, *Assistant Examiner.*